J. R. HEYWOOD.
Oven.

No. 210,325.  Patented Nov. 26, 1878.

Witnesses:
G. B. Maynadier
C. H. Slade

Inventor:
John R. Heywood
by Maynadier & Hoale
Attys

UNITED STATES PATENT OFFICE.

JOHN R. HEYWOOD, OF BOSTON, MASSACHUSETTS.

IMPROVEMENT IN OVENS.

Specification forming part of Letters Patent No. 210,325, dated November 26, 1878; application filed November 7, 1878.

*To all whom it may concern:*

Be it known that I, JOHN R. HEYWOOD, of Boston, county of Suffolk, and State of Massachusetts, have invented an Improvement in Ovens, of which the following is a full, clear, concise, and exact description, reference being had to the accompanying drawings, making a part hereof.

Figure 1:
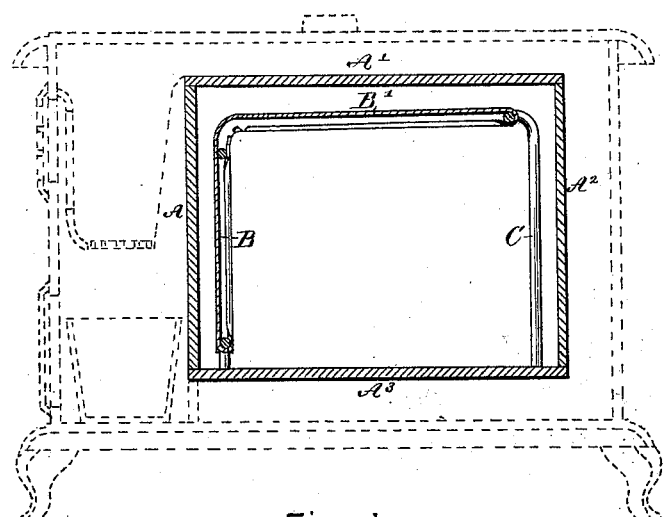
Figure 2:
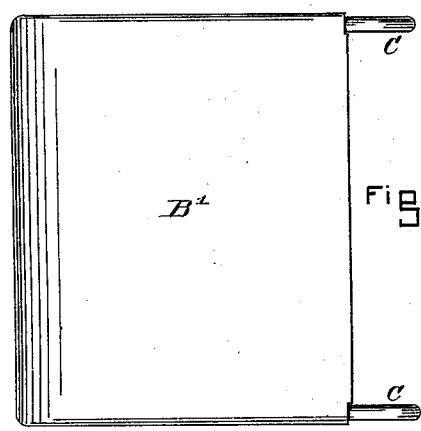
Figure 3:
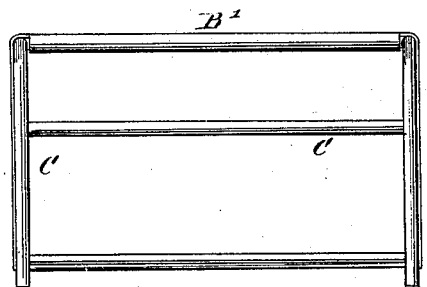
Figure 4:
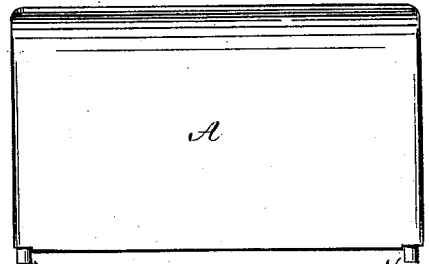

In the drawings, Figure 1 is a section of an oven with my invention applied to it. Figs. 2, 3 and 4 are a plan and two side views of my baking attachment.

My invention consists, mainly, in an oven provided with an attachment, which will be now fully described, each article also constituting a part of my invention.

In the common cooking stoves and ranges, as well as in other ovens, the fuel is arranged as indicated in Fig. 1 of the drawings, all the fuel being near one of the plates of the oven, and the products of combustion pass over the top plate of the oven, down along the back side plate, and under the bottom plate into the escape-flue. The practical consequence of this arrangement is that the oven is hotter near the plate next the fire than at any other part, and is also hotter at the top than at the bottom, the products of combustion growing colder as they travel from the fire. In a large number of ovens this defect is so marked that a loaf of bread, for example, if not turned or shifted from time to time, will be scorched on one side and on the top, and very "slack-baked" on the other side and on the bottom.

Figure 5:
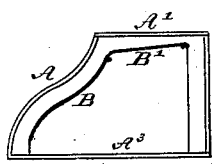
Figure 6:
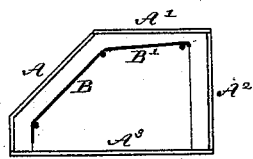

The object of my invention is to remedy this defect in ovens; and my invention consists in an oven provided with a plate which extends vertically (where the side of the oven is vertical) from near the bottom of the oven (about an inch from the bottom in an oven of the size usual in family cook-stoves and ranges) to near the top, (about an inch from the top in such ovens,) and is then bent over and extends nearly horizontally across the oven, the plate lying one or two inches from the hot side plate of the oven and about one or two inches from the top plate of the oven. (See Figs. 5 and 6, which are diagrams illustrating my invention applied to other forms of ovens.)

The operation is as follows: The excess of heat from the hot plate A of the oven is prevented from overcooking the article to be cooked, and in like manner the article is protected from the excess of heat in the top plate $A^1$ of the oven. At the same time the heated air between the side plate A and the wall B rises and passes over the horizontal wall $B'$, and down under the vertical wall B, between the bottom of that wall and the bottom plate $A^3$, where it rises again, as before, thus keeping up a circulation of air, which is so directed by the plate (which may be also called a "deflector" for this reason) as to keep the temperature acting upon the article to be cooked substantially uniform on all sides, including the top and bottom, of the article to be cooked.

The walls B $B'$ of the plate or deflector are best made of sheet metal, and may be secured in the oven in any convenient way; but, in order to make my invention readily applicable to ovens now in use, I have invented the device shown in the drawings, which consists of a frame, C, formed of wire of a suitable size, and a plate of sheet metal, B $B'$, secured to it, so that its lower edge shall be about an inch from that part of the frame which rests upon the bottom plate of the oven, and its upper edge shall extend about two-thirds across the top of the frame.

For some ovens it may be found that the bottom edge of the vertical plate B should be farther above the bottom plate of the oven than is necessary in others, and this plate should therefore, when the device may be required for ovens which vary as to the excess of heat from the hot plate A, be so mounted on frame C that it may be adjusted. This is readily done by mounting the sheet of metal which constitutes the wall B in ways attached to the frame, the upper part of the sheet bending over a few inches under the metal sheet which constitutes the wall $B'$. This latter sheet may also in some cases require to be adjustable, and in these cases should be mounted in the same way.

In practice, however, all that is necessary is to use a single sheet, as shown in the drawings, as the adjustment above described is unnecessary in most cases.

The distance of the wall B from the hot wall A should be varied a little for the best results, being a little farther off when the plate A is extremely hot and a little nearer when not so hot, and the same is true as to the distance of the wall B' from the top plate $A^1$; but this is practically of little importance in most cases as to the distance of the wall B from plate A, and of even less practical importance as to the distance of B' from $A^1$. But when the shield is made as described it is readily adjusted to bring the wall B to the desired distance from plate A, and the frame C may be readily made adjustable, as is obvious without description, so that the distance of wall B' from plate $A^1$ may be adjusted.

What I claim as my invention is—

1. An oven, in combination with the walls B B', the bottom of wall B being above the bottom of the oven to admit of circulation, as described.

2. The oven attachment above described, composed of the frame C and the sheet metal B B', extending from near the bottom of the frame at one side and across the frame at the top nearly to the other side, the whole constructed and adapted for use substantially as described.

JOHN R. HEYWOOD.

Witnesses:
J. E. MAYNADIER,
GEORGE O. G. COALE.